April 21, 1964   E. R. BOWDEN ETAL   3,130,025
FILTERING FILLER NECK BREATHER CAP
Filed March 30, 1962
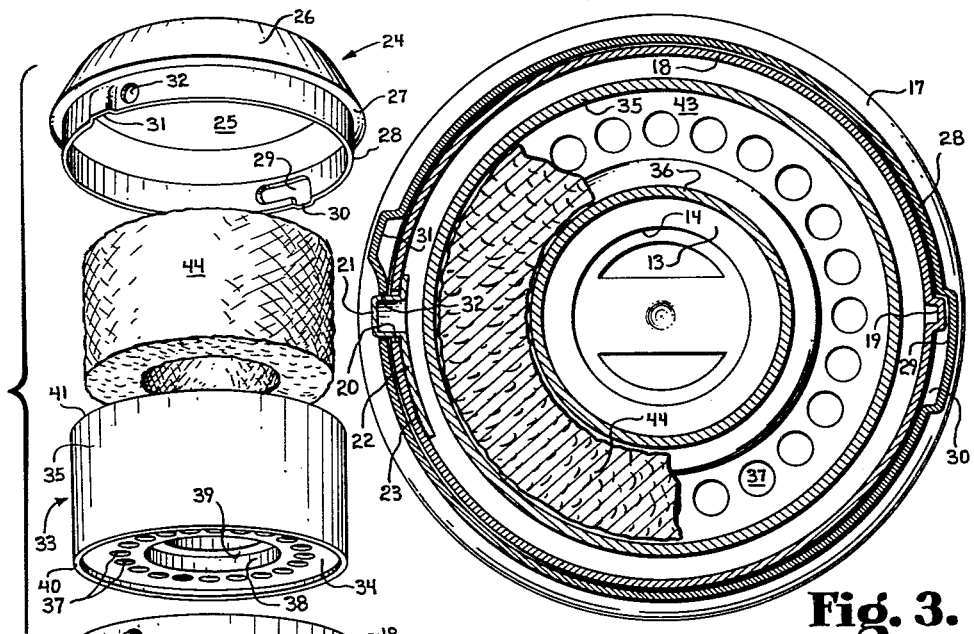
Fig. 3.
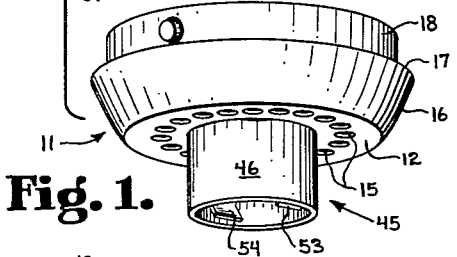
Fig. 1.
Fig. 4.
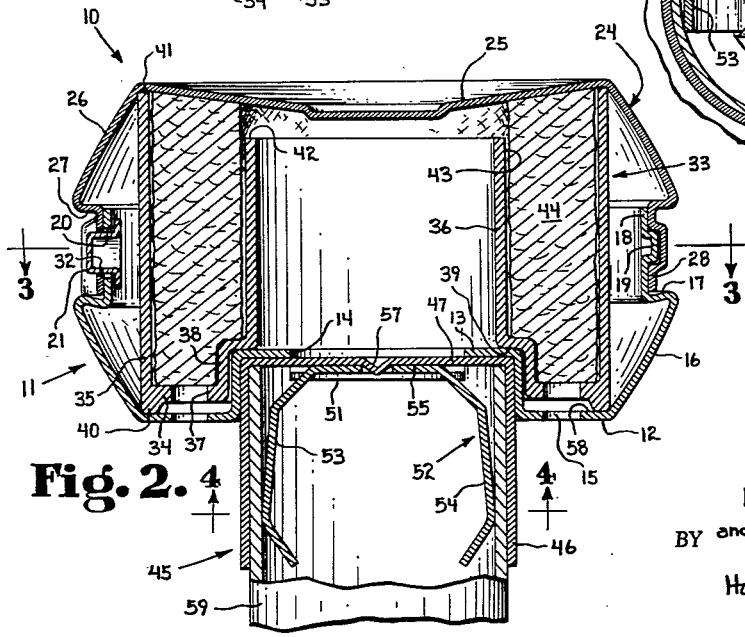
Fig. 2.
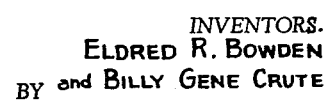
INVENTORS.
ELDRED R. BOWDEN
BY and BILLY GENE CRUTE
Hood, Gust & Irish
Attorneys

United States Patent Office 3,130,025
Patented Apr. 21, 1964

3,130,025
FILTERING FILLER NECK BREATHER CAP
Eldred R. Bowden and Billy G. Crute, Connersville, Ind., assignors to Stant Manufacturing Company, Inc., Connersville, Ind., a corporation of Indiana
Filed Mar. 30, 1962, Ser. No. 183,931
5 Claims. (Cl. 55—503)

Many liquid reservoirs are provided with breather necks which desirably should be capped but should be protected against dust and similarly air-carried contaminants. One example of such a reservoir is the oil-filled crank case of a conventional engine for an automotive vehicle. Customarily, the filler neck for such a crank case constitutes also the breather neck therefor, and consequently the present invention will be described in connection with such a dual-function neck, though it will be understood that the cap herein disclosed may be associated with a neck or opening whose only function is to permit breathing, either in an engine crank case environment or in association with any other liquid reservoir, or the like.

The primary object of the present invention is to provide a cap to protect an opening into a chamber or reservoir, the cap being constructed and arranged to house a disposable filter assembly, preferably of the depth type, in such a way as to provide for free flow of air or other gases or vapors through the said opening, but only via a path through the filter medium incorporated in the disposable unit.

A further object of the invention is to provide a cap construction which will facilitate the removal and replacement of such a disposable filter unit and which will automatically establish effective seals between the cap structure and the filter unit of such character as to enforce fluid flow only through a path including the filter material.

A still further object of the invention is to provide a cap structure having the above characteristics while presenting an attractive appearance which does not call attention to the presence of the filter unit and providing for conventionally-ready application of the cap to conventional breather necks and removal of the cap from such necks without disturbing the association of the filter unit therewith or its operative relation to the cap structure.

Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

FIG. 1 is an exploded view of a cap and filter assembly constructed in accordance with the present invention;

FIG. 2 is an enlarged vertical section through the filter-containing cap shown in cooperative association with a fragment of one conventional form of filler and breather neck;

FIG. 3 is a horizontal section taken substantially on the line 3—3 of FIG. 2 and looking in the direction of the arrows; and FIG. 4 is a horizontal section taken substantially on the line 4—4 of FIG. 2 and looking in the direction of the arrows.

Referring more particularly to the drawings, it will be seen that the reference numeral 10 indicates generally a two-part cap constructed and arranged to contain a filter unit and provided with means for mounting the cap in protective relation upon one conventional form of crank case filler neck. The illustrated cap comprises a bottom member indicated generally by the reference numeral 11 and formed, preferably from sheet metal, to define a bottom wall 12 shaped to provide a central, preferably cylindrical, upstanding table 13, said table being formed with a central opening 14. The presence of the table 13 defines an annular, depressed channel 58 which is formed with a series of perforations 15 therethrough circumscribing the table 13. An upwardly-flaring wall 16 is radially-outwardly disposed beyond the perforations 15 and, near its upper end, is bent inwardly to define an upwardly-facing shoulder 17. The wall 16 terminates in a distal, substantially cylindrical, upstanding flange 18. At one point in its periphery, the flange is formed with a radially-outward projection 19, and at another point in its periphery, preferably diametrically opposite the projection 19, said flange is formed with a perforation 20 for the accommodation of a button 21 carried or formed upon a leaf spring 22 which is suitably secured, as by welding 23, to the internal surface of the flange 18. It will be apparent that, because of the inherent resiliency of the spring 22, the button 21 is radially movable with respect to the flange 18 and is yieldably biased in a radially-outward direction.

The cap 10 further comprises a cover member 24 which is likewise formed, preferably from sheet metal, to define a closed top wall 25 and a downwardly-flaring peripheral wall 26 which, near its lower edge, is bent inwardly to define a downwardly-facing shoulder 27, said wall 26 terminating in a substantially cylindrical, distal, depending flange 28 having an axial extent slightly less than that if the flange 18. At one point in its periphery, the flange 28 is formed with an inwardly-opening bayonet groove 29 which opens at 30 through the distal edge of the flange 28; and at another point in its periphery (determined by the relationship between the projection 19 and the button 21) said flange 28 is formed with an inwardly-opening groove 31 which likewise opens through the distal edge of the flange 28. Closely adjacent the groove 31, the flange 28 is formed with a perforation 32 proportioned and designed to permit the projection therethrough of the button 21.

It will be seen that the flange 28 is proportioned and designed to be telescopically sleeved on the flange 18, the protrusion 19 entering the bayonet groove 29 and the button 21 entering the groove 31. Now, if the cover 24 is turned in a clockwise direction, as viewed from above, the protrusion 19 will be engaged in the peripherally extending portion of the groove 29, the button 21 will be cammed inwardly as the groove 31 departs from registry therewith, and when the cover 24 has been turned to a predetermined degree, the button 21 will snap outwardly to penetrate the perforation 32, thereby latching the cover against retrograde rotary movement. In this position of the parts, the engagement of the button 21 in the perforation 32 and the engagement of the protrusion 19 in the peripherally extending portion of the groove 29 securely retain the cover 24 against removal from the bottom member 11. However, when separation of the cap parts is desired, the button 21 may be pressed inwardly against the tendency of the spring 22, whereby said button will be disengaged from the perforation 32, whereupon the cover member may be turned in a counter-clockwise direction to bring the button into registry with the groove 31 and the projection 19 into registry with the axially-extending portion of the groove 29, whereafter the cover 24 may be readily disengaged from the bottom member 11.

A filter cartridge, indicated generally by the reference numeral 33, may be formed of any suitable, inexpensive, relatively air-impermeable material; and we presently believe that polypropylene is the optimum material. Said cartridge is formed to provide an annular bottom wall 34, an outer, upstanding wall 35 and an inner, upstanding wall 36. The upstanding walls 35 and 36 are preferably integral with the bottom wall 34, but whether integral or integrated, the upstanding walls will necessarily have a substantially air-tight relation with the bottom wall 34. Said bottom wall 34 is formed with a series of perforations 37; and the inner, upstanding wall 36 is formed to provide a radially-outward offset 38 defining a downwardly-facing shoulder 39 which, when the cartridge 33 is assembled with the cap 10, has a sealing bearing upon the upward surface of the table 13.

The lower portion of the cartridge 33 is disposed in the channel 58, and preferably the outer wall 35 of said cartridge has a downward extension 40 which bears upon, and preferably has sealing engagement with, the floor of the channel 58 in a region radially-outwardly located relative to the perforations 15.

The cartridge wall 35 is so proportioned that, when the cartridge is disposed within the chamber defined between the cap members 11 and 24 and those cap members are assembled in the relationship illustrated in FIG. 2, the upper edge 41 of said wall has a sealing engagement with the closed top wall 25 of the cover member 24 in a region located radially-outwardly beyond the perforations 15. The inner cartridge wall 36, however, terminates short of the wall 25 of the cover member 24 so that its upper edge 42 is axially spaced from said wall 25. Thus, a free flow path for air or other gases is established between the atmosphere and the opening 14 in the table 13 of the bottom member 11, through the perforations 15, the perforations 37, the annular chamber 43 defined between the walls 35 and 36 of the cartridge, and the space between the wall 25 of the cover member 24 and the upper edge 42 of the wall 36.

A mass of filter material 44 is disposed in the cartridge channel 43. Such material may be of any well-known type, but preferably will constitute an annular, laminated roll of expanded aluminum foil. Preferably the mass 44 will be so proportioned that, when in relaxed condition, it will project above the upper edge 41 of the wall 35 so that, when the loaded cartridge 33 is confined between the cap members 11 and 24, the top wall 25 of the member 24 will engage the uppermost edge of the filter mass 44 to compress that mass.

Suitable means, indicated by the reference numeral 45, is associated with the cap member 11 for mounting the cap 10 upon a neck to be protected. One conventional form of crank case filler and breather neck is illustrated in FIG. 2 at 59. For association with that type of neck, the retainer means 45 may comprise a tubular skirt 46 proportioned and designed for snug telescopic reception upon the neck 59 and a base or web 47 engageable with the open, free end of said neck. As shown, the base or web 47 is punched out as at 48 and 49 to define bendable tongues 50 and 51, thereby producing openings through said web to register with the opening 14 in the table 13. A spring, indicated generally at 52, comprises opposite, outwardly-biased legs 53 and 54 and a flat base 55 joining said legs. The base 55 is formed with a central perforation 56 for the accomodation of a stud 57 formed in the element 47, to center the spring 52 relative to the skirt 46; and the tongues 50 and 51 are then bent inwardly to underlie the spring base 55 and retain the spring 52 in place. The spring 52 is so proportioned and arranged that, when the skirt 46 is sleeved on the neck 59, the spring legs 53 and 54 resiliently engage the inner surface of the neck 59 to retain the cap 10 frictionally in seated relation on said neck.

It will be apparent that, with the parts in the arrangement illustrated in FIG. 2, the reservoir with which the neck 59 is associated may breathe freely, but only through the depth of the filter material 44. It will also be seen that, while the cap 10 may be readily removed from and replaced upon the neck 59 for testing and/or filling the reservoir with which it is associated without disturbing the operative location of the filter unit 33, it is very easy to disengage the cover member 24 from the bottom member 11 in order to inspect and, if necessary, to remove and replace the filter unit. While we presently believe that it will be desirable to discard the cartridge 33 whenever the filter mass becomes clogged, it will be apparent that it would be entirely feasible to remove the filter mass from the cartridge and insert a new filter mass in the same cartridge for further use.

It is important, of course, to provide a seal between the bottom cap member 11 and the inner wall 36 of the cartridge 33 in a region located radially-inward relative to the perforations 15 and to provide a seal between the cartridge 33 and one or the other of the cap members 11 and 24 in a region located radially-outwardly relative to the perforations 15 in order to enforce air flow between the atmosphere and the interior of the neck 59, through the filter mass 44. As shown, the first such seal is provided by engagement of the shoulder 39 with the uppermost surface of the table 13, enforced by engagement of the wall 25 with the wall 35. It will be apparent that such inner seal might, however, be provided by a close fit of the offset 38 with the cylindrical wall which defines the table 13, though we presently believe the illustrated arrangement to be preferable. Similarly, we believe that the illustrated arrangement, in which the outer wall 35 of the cartridge has sealing engagement both with the floor 12 of the member 11 and with the roof 25 of the member 24, is optimum; but it will readily be perceived that either of those seals could be omitted without permitting air flow between the atmosphere and the interior of the neck 59 to by-pass the filter medium.

For commercial purposes, it will be necessary to provide various forms of retainer means for cooperative association with various commercially-available forms of necks; but the details of such retainer means do not form any element of the present invention and therefore are not specifically disclosed.

We claim as our invention:

1. A filtering cap comprising open-ended, tubular retainer means, a cap bottom member fixed to said retainer means and centrally perforated to communicate with one end of said retainer means, said cap bottom member being formed with a series of perforations located radially outwardly relative to said retainer means and being formed with an annular, upstanding wall located radially outwardly relative to said series of perforations, a cap cover member having a closed top wall and an annular, depending wall telescopically associated with said cap bottom member annular wall, said cap bottom member and cap cover member thus defining a chamber, means for securing said annular walls against separation, a filter cartridge received in said chamber, said cartridge comprising a perforated, annular bottom wall, an upstanding, imperforate outer wall arranged in sealing engagement with one of said cap members, and an upstanding, imperforate inner wall having perimetral sealing engagement with said cap bottom member in a region located radially inwardly relative to said series of perforations and terminating short of said cover cap member top wall, and a mass of filter material snugly received in the annular space between said cartridge upstanding walls.

2. A filtering breather cap comprising a cup-shaped base formed with a central opening and a series of perforations surrounding said central opening, an inverted cup-shaped cover having a closed top wall, said base and cover being formed for cooperative engagement to define a chamber, a filter cartridge received in said chamber, said cartridge comprising an annular, perforated bottom wall and radially-spaced, imperforate inner and outer upstanding walls, said outer cartridge wall having sealing engagement with one of said cup-shaped members in a region located radially outwardly relative to said series of perforations and said inner cartridge wall having sealing engagement with said base in a region located between said central opening and said series of perforations and terminating short of said cover top wall, a mass of filter material snugly received between said cartridge upstanding walls, and means for supporting said cap from a filler neck and providing communication between said central opening and the interior of such a neck.

3. A filtering breather cap comprising a base member and a cover member, means for securing said members together to define a chamber therebetween, said base member being formed with a central opening and a series of perforations surrounding said central opening, a filter cartridge received in said chamber, said cartridge comprising an annular, perforated bottom wall and radially-spaced, imperforate inner and outer upstanding walls, said outer cartridge wall having sealing engagement with one of said members in a region located radially outwardly relative to said series of perforations and said inner cartridge wall having sealing engagement with said base member in a region located between said central opening and said series of perforations and terminating short of said cover, a mass of filter material snugly received between said cartridge upstanding walls, and means for supporting said cap from a filler neck and providing communication between said central opening and the interior of such a neck.

4. A filtering breather cap comprising a cup-shaped base member formed to provide a central, perforated table surrounded by a depressed channel having a series of perforations therethrough, and an upwardly flaring perimetral wall terminating in a substantially cylindrical flange, an inverted cup-shaped cover member formed to provide a closed top wall and a downwardly flaring perimetral wall terminating in a substantially cylindrical flange proportioned and designed for telescopic association with the flange of said base member to define a chamber between said base and cover members, a disposable filter unit received in said chamber, said filter unit comprising a cartridge including an inner, upstanding, imperforate annular wall having a radially-outward offset near its lower end, said offset defining a transverse shoulder adapted to rest in sealing engagement with the top of said table and a cylindrical surface embracing the periphery of said table, a perforated bottom wall, and an outer, upstanding, imperforate annular wall, and a mass of filter material snugly received between said cartridge upstanding walls, said outer cartridge wall sealingly engaging the closed top wall of said cover member and said inner cartridge wall terminating short of said top wall, and open-ended tubular means registering with the perforation in said table and depending below said channel.

5. The cap of claim 4 in which the diametrically-larger of said flanges is formed with an inwardly-opening bayonet groove having an axially-extending portion opening through the distal edge of said larger flange and having a peripherally-extending portion, said larger flange further being formed with a second inwardly-opening groove opening through said distal flange edge and peripherally spaced from said bayonet groove, a fixed projection on the other of said flanges for engagement in said bayonet groove, and an outwardly-biased, radially movable projection associated with said other flange for engagement in said second groove, said larger flange being provided, at a point peripherally spaced from said second groove, with a perforation through which said movable projection extends when said fixed projection is fully seated in the peripherally-extending portion of said bayonet groove.

References Cited in the file of this patent
UNITED STATES PATENTS

| | | |
|---|---|---|
| 1,398,685 | Gordon | Nov. 29, 1921 |
| 2,137,054 | Kamrath | Nov. 15, 1938 |
| 2,187,264 | Carlson | Jan. 16, 1940 |
| 2,603,308 | McCall | July 15, 1952 |
| 2,675,886 | McMullen | Apr. 20, 1954 |
| 2,766,845 | Raymond | Oct. 16, 1956 |